(12) United States Patent
Togami et al.

(10) Patent No.: US 7,455,463 B2
(45) Date of Patent: Nov. 25, 2008

(54) HIGH DENSITY ARRAY OF OPTICAL TRANSCEIVER MODULES

(75) Inventors: Chris K. Togami, San Jose, CA (US); Paul Rosenberg, Sunnyvale, CA (US); Gary Sasser, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 604 days.

(21) Appl. No.: 11/145,268

(22) Filed: Jun. 2, 2005

(65) Prior Publication Data

US 2005/0286906 A1 Dec. 29, 2005

Related U.S. Application Data

(60) Provisional application No. 60/576,112, filed on Jun. 2, 2004.

(51) Int. Cl.
*G02B 6/36* (2006.01)
*H04B 10/00* (2006.01)

(52) U.S. Cl. .............................. 385/93; 385/92; 385/88; 385/53; 385/52; 385/14; 398/164; 398/135

(58) Field of Classification Search ................... 385/53, 385/88, 89, 92, 93, 94, 14, 52; 398/135, 398/138, 139, 164
See application file for complete search history.

(56) References Cited

U.S. PATENT DOCUMENTS 5,047,835 A * 9/1991 Chang ........................ 257/433
5,280,191 A * 1/1994 Chang ........................ 257/712
7,215,889 B2 * 5/2007 Light ......................... 398/135
2003/0228799 A1 * 12/2003 Machado et al. ............ 439/607
2005/0271391 A1 * 12/2005 Togami et al. .............. 398/164
2005/0286906 A1 * 12/2005 Togami et al. .............. 398/164
2006/0153507 A1 * 7/2006 Togami et al. ................ 385/93

* cited by examiner

*Primary Examiner*—Brian M Healy
(74) *Attorney, Agent, or Firm*—Workman Nydegger

(57) ABSTRACT

Embodiments of the present invention are directed to high density arrays of optical transceiver modules. A first fabricated package includes a light source and/or light detector, a first surface with at least one opening for transferring optical signals, and a second opposing surface. A second fabricated package has an opening for accepting a component insert and is oriented such that the length of the second fabricated package is essentially perpendicular to the second opposing surface. A lead frame mechanically connects the first fabricated package and the second fabricated package and electrically connects the light source and/or light detector in the first fabricated package to contacts exposed in the opening of the second fabricated package. A component insert is mechanically coupled to the second fabricated package and electrically coupled to the exposed contacts such that components of the component insert can electrically interoperate with the light source and/or light detector.

25 Claims, 7 Drawing Sheets

HIGH DENSITY ARRAY OF OPTICAL TRANSCEIVER MODULES

CROSS-REFERENCE TO RELATED APPLICATIONS

The present invention claims priority to U.S. Provisional Patent Application Ser. No. 60/576,112, entitled "High Density Array Of Optical Transceiver Modules", filed on Jun. 2, 2004, the entire contents of which are incorporated herein by reference.

BACKGROUND OF THE INVENTION

1. The Field of the Invention

The present invention is generally related to optical devices used in fiber optic communications systems. More particularly, the present invention provides for high density arrays of optical transceiver modules.

2. The Relevant Technology

Fiber optic technology is increasingly employed as a method by which information can be reliably transmitted via a communications network. Networks employing fiber optic technology are known as optical communications networks, and are marked by high bandwidth and reliable, high-speed data transmission.

Optical communications networks employ optical transceivers in transmitting information via the network from a transmission node to a reception node. Generally, such optical transceivers implement both data signal transmission and reception capabilities. For example, a transmitter portion of a transceiver is configured to convert an incoming electrical data signal into an optical data signal and a receiver portion of the transceiver is configured to convert an incoming optical data signal into an electrical data signal.

More particularly, an optical transceiver at the transmission node receives an electrical data signal from a network device, such as a computer, and converts the electrical data signal to a modulated optical data signal using an optical transmitter such as a laser. The optical data signal can then be transmitted in a fiber optic cable via the optical communications network to a reception node of the network. At the reception node, the optical data signal is received at another optical transceiver that uses a photodetector, such as a photodiode, to convert the received optical data signal back into an electrical data signal. The electrical data signal is then forwarded to a host device, such as a computer, for processing.

Generally, multiple components are designed to accomplish different aspects of these functions. For example, an optical transceiver can include one or more optical subassemblies ("OSA") such as a transmit optical subassembly ("TOSA"), and a receive optical subassembly ("ROSA"). Typically, each OSA is created as a separate physical entity, such as a hermetically sealed cylinder that includes one or more optical sending or receiving components, as well as electrical circuitry for handling and converting between optical and electrical signals. Within the optical transceiver, each OSA generally includes electrical connections to various additional components such as a transceiver substrate, sometimes embodied in the form of a printed circuit board ("PCB"). OSAs in a conventional transceiver are generally oriented such that a longitudinal axis defined by the OSA is substantially parallel to the transceiver substrate. The transceiver substrate, in turn, is mounted to the board of a host bus adapter ("HBA") or other component.

The transceiver substrate can include multiple other active circuitry components particularly designed to drive or handle electrical signals sent to or returning from one or more of the OSAs. Accordingly, such a transceiver substrate will usually include a number of electrical transmission lines with the one or more OSAs. Such connections may include "send" and "receive" data transmission lines for each OSA, one or more power transmission lines for each OSA, and one or more diagnostic data transmission lines for each OSA. These transmission lines are connected between the transceiver substrate and the OSA using different types of electrical connectors, examples of which include an electrical flex circuit, a direct mounting connection between conductive metallic pins extending from the OSA and solder points on the PCB, and a plug connection that extends from the PCB and mounts into electrical extensions from an OSA.

As part of ongoing efforts to uniformly reduce the size of optical transceivers and other components, manufacturing standards such as the small form factor ("SFF"), small form factor pluggable ("SFP"), and 10 gigabit small form factor pluggable ("XFP") standards have been developed. Nonetheless, the size of most optical transceivers, even those that comply with such manufacturing standards, best suits them for external connections to a computer system, such as a desktop computer, a laptop computer, or a handheld digital device.

For example, an SFF or SFP optical transceiver can be used to provide an interface between an optical cable and a standard network cable, such as an Ethernet cable for example, that plugs into a computer system. However, the number of components within a conventional transceiver, as well as the orientation and the size of SFF or SFP optical transceivers, makes it difficult, if not impossible, to integrate conventional optical transceivers into smaller spaces, such as within a pluggable card for use in a laptop computer or hand held device. For example, despite their relatively compact nature, conventional SFF, SFP, and XFP optical transceiver bodies are still too wide and/or tall to fit within a typical PCMCIA laptop envelope.

A related problem concerns the connections of the optical transceiver. In particular, use of the optical transceiver as an external, rather than internal, component necessitates the use of additional connectors and connections, which increase both the overall cost associated with the system as well as the complexity of the system. As well, optical transceivers employed in an external, rather than integrated, configuration are more prone to rough handling and damage than an integrated component.

Furthermore, even if the conventional optical transceiver could fit within such an envelope, the length of the conventional SFF, SFP, or XFP optical transceiver is such that the transceiver substrate takes up an inordinate amount of board space on a corresponding host bus adapter ("HBA") or other component to which the optical transceiver is attached. This problem is of particular concern in light of the concurrent demands for increases in functionality and decreases in component size. These, and other, considerations make conventional optical transceivers less than ideal for integration within many computer systems.

In some environments, a number of optical transceivers are mounted in a network panel and configured to include an external connection to a computer system. Network panels such as those in optical hubs and optical routers are typically larger than HBAs included in desktop and laptop computers. Thus, these network panels can accommodate some number of transceivers. For example, to lower cost it may be advantageous to include as many transceivers as possible on an optical hub panel. However, typical transceiver form factors and substrate configurations limit the density with which transceivers can be placed on network panels.

Further, many typical connectors are released by applying pressure to opposing sides of the connectors. Thus, transceivers must be spaced far enough apart to allow connectors to be manually released. That is, there must be enough room between connectors for a user to position their fingers (or an appropriate tool) on either side of the connectors. Accordingly, connector size and connector configuration can also limit the density with which transceivers can be placed on network panels. Accordingly, what would be advantageous are transceiver and connector configurations that facilitate higher densities of optical transceivers.

BRIEF SUMMARY OF THE INVENTION

The foregoing problems with the prior state of the art are overcome by the principles of the present invention, which are directed to high density arrays of optical transceiver modules. Modular optical devices can be configured to conserve space on a printed circuit board such that a higher density of modular optical devices can be included on the printed circuit board. A first fabricated package includes a light source for generating optical signals and/or a light detector for receiving optical signals and has a first surface with one or more openings for transferring optical signals and a second opposing surface. A second fabricated package has an opening for receiving a component insert and is oriented such that the length of the second fabricated package is essentially perpendicular to the second opposing surface. A lead frame mechanically connects the first fabricated package and the second fabricated package and electrically connects the light source and/or light detector in the first fabricated package to contacts exposed in the opening of the second fabricated package. A component insert is mechanically coupled to the second fabricated package and electrically coupled to the exposed contacts in the opening of the second fabricated package such that components of the component insert can electrically interoperate with the light source and/or light detector.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1A:
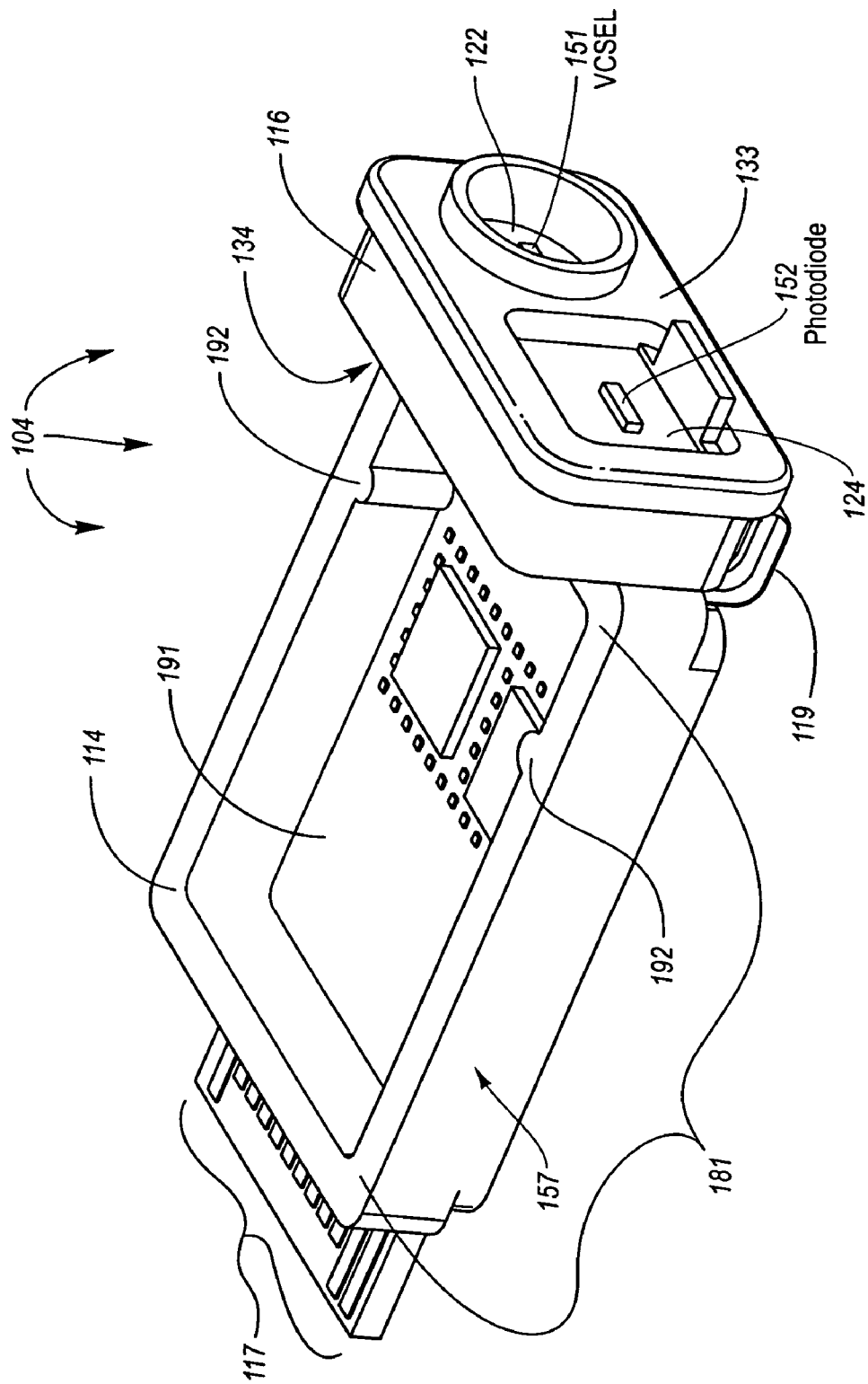
FIG. 1A illustrates components of an example dual stage fabricated package including a component insert with the length of one fabricated package essentially perpendicular to the surface of another fabricated package to conserve space on a substrate.

The principles of the present invention relate to high density arrays of optical transceiver modules. Modular optical devices can be configured to conserve space on a printed circuit board such that a higher density of modular optical devices can be included on the printed circuit board. A first fabricated package includes a light source for generating optical signals and/or a light detector for receiving optical signals and has a first surface with one or more openings for transferring optical signals and a second opposing surface. A second fabricated package has an opening for receiving a component insert and is oriented such that the length of the second fabricated package is essentially perpendicular to the second opposing surface. A lead frame mechanically connects the first fabricated package and the second fabricated package and electrically connects the light source and/or light detector in the first fabricated package to contacts exposed in the opening of the second fabricated package. A component insert is mechanically coupled to the second fabricated package and electrically coupled to the exposed contacts in the opening of the second fabricated package such that components of the component insert can electrically interoperate with the light source and/or light detector.

In general, embodiments of the present invention describe modular optical devices (e.g., TOSAs and ROSAs) that can be integrated within the relatively small physical envelopes defined by compact components, such as a network panel. Embodiments of the present invention can interoperate with an optical hub, optical router, or other similar computer system, while maintaining compliance with applicable operational and performance standards.

As used herein, "OSA" refers to any one of a transmit optical subassembly ("TOSA") or a receive optical subassembly ("ROSA"). Further, a "substrate" refers to a printed circuit board ("PCB") having electrically conductive elements such as circuit traces for transmitting power and/or communication signals between components of a modular optical device and another system or device, such as a computer system. A transceiver PCB can include circuits, devices and systems for facilitating the operation and control of the modular optical device. Such circuits, devices and systems include, but are not limited to, a laser driver, a post amplifier, and transimpedance amplifier.

Embodiments of the present invention include a dual stage fabricated lead frame package (hereinafter referred to as a "dual stage fabricated package"). The dual stage fabricated package includes a first fabricated package and a second fabricated package. A common lead frame mechanically couples the first fabricated package to the second fabricated package and electrically couples components included in the first fabricated package to contacts exposed at the second fabricated package.

The first fabricated package can include a light source (e.g., vertical cavity surface emitting laser ("VCSEL")) and/or light detector (e.g., photodiode) as well as corresponding openings for transmitting and receiving optical signals. The first fabricated package can have a first surface with an opening for transferring generated optical signals to other optical components and with an opening for transferring received optical signals to the light detector. The first fabricated package can also have a second opposing surface that is on an opposite side of the first fabricated package relative to the first surface.

The second fabricated package can be configured such that the length of the second fabricated package is essentially perpendicular to the second surface of the first fabricated package. Thus, a side of the second fabricated package having a smaller footprint can be placed in mechanical contact with a substrate (e.g., a network panel). Mechanically connecting a side of the second fabricated package having a smaller footprint conserves substrate space and allows higher densities of optical devices to be mounted on the substrate.

The second fabricated package includes exposed contacts for electrically connecting to other components having active and/or passive circuitry components for driving the light source (e.g., a laser driver), converting a received light signal (e.g., transimpedance amplifier), or for implementing other optical signal processing. Such other components can be component inserts accepted within the second fabricated package. These other components can be, for example, PCBs, ceramic substrates, silicon substrates, glass substrates, and other lead frame-based (possibly insert-molded) substrates that include packaged ICs, bare ICs, and/or passive SMT components.

PCB or other component inserts accepted within the second fabricated package can be wire bonded to contacts exposed at the second fabricated package. Accordingly, circuitry components on a PCB or other component insert can be electrically coupled (via the lead frame) to the light source and/or light detector. For example, an assembled PCB or other component insert can include die attached and/or wire bonded integrated circuits. Integrated circuits can be epoxy glob topped or capped for protection. An assembled PCB or other component insert can also include surface mount components. A PCB or other component insert can be mechanically coupled to the second fabricated package using an adhesive, such as, for example epoxy.

The second fabricated package can also include an external connection, such as, for example a lead frame in a through hole pin or formed configuration, for connecting (e.g., surface mounting) the dual stage fabricated package to a Printed Circuit Board Assembly ("PCBA"). When active and/or passive circuitry is included in other components, there is a reduced (and potentially no) need to duplicate such circuitry on the PCBA. Accordingly, the size of a network panel can be reduced.

Embodiments of the dual stage fabricated package can be mechanically coupled to a lens block that includes receptacles for accepting one or more lens pins. For example, a lens block can be configured to accept a transmission lens pin, a reception lens pin, or a combination of transmission lens pins and/or reception lens pins. Accepted lens pins can be mechanically coupled to the lens block. Lens pins mechanically coupled to the lens block can provide appropriate receptacles for receiving external optical connections. Lens pins can include lenses that focus optical signals.

Accordingly, a lens included in a (transmission) lens pin can direct a generated optical signal from the dual stage fabricated package to an external component (e.g., an optical cable). On the other hand, a lens included in a (reception) lens pin can direct a received optical signal from an external component to the dual stage fabricated package. For example, an optical signal generated at a laser included in the first portion of the dual stage fabricated package can be transferred through the lens block, transferred through a lens in a corresponding transmission lens pin, to a corresponding optical cable. Likewise, an optical signal received from an optical cable can be transferred through a lens in a corresponding reception lens pin, transferred through the lens block, into a corresponding photodiode in the first portion of the dual stage fabricated package.

A dual stage fabricated package, a lens block, and one or more lens pins can be passively or actively aligned to optimize optical signal strength. Dual stage fabricated packages, lens blocks, and lens pins can be fabricated (e.g., molded, machined, cast, etc.) from plastic, metal, or any other suitable material that will allow for alignment of such components relative to one another. A dual stage fabricated package, a lens block, and one or more lens pins can be mechanically coupled using a variety of coupling means, such as, for example, adhesive, metal clips, staples, laser welding, barbed pin, etc. Laser welding can be particularly advantageous when components (e.g., a lens block and a portion of a dual stage fabricated package) are made of similar plastic compounds. Lens pins (e.g., lens pins 108 and 106) can be held to lens block 103 using similar attachment means. Accordingly, a modular optical device, such as, for example, an OSA, can include, a dual stage fabricated package, a component insert, a lens block, and one or more lens pins.

Referring now to FIG. 1A, FIG. 1A illustrates components of an example dual stage fabricated package 104 including a PCB insert 191. As depicted, the length of second fabricated package 114 is essentially perpendicular to the bottom surface of first fabricated package 116. This orientation reduces the footprint of dual stage fabricated package 114 on a substrate thereby conserving space on the substrate. Generally, components similar to those in FIG. 1A can be used in modular optical devices having reduced footprints that facilitate higher density arrays of optical transceivers. The foregoing is exemplary however, and modular optical devices can be implemented in various other forms as well. Further, embodiments of the invention are suitable for use in connection with a variety of data rates such as about 1 Gbps, about 2 Gbps, about 4 Gbps, and about 10 Gbps, or higher.

As depicted, dual stage fabricated package 104 includes first fabricated package 116 and second fabricated package 114. First fabricated package 116 and second fabricated package 114 are mechanically and electrically connected by lead frame portion 119.

Surface 133 (of first fabricated package 116) includes a transmission opening 122 for transmitting generated optical signals. For example, VCSEL 151 (Vertical Cavity Surface Emitting Laser) can transmit optical signals out of transmission opening 122. Surface 133 also includes detector opening 124 for detecting received optical signals. For example, photodiode 152 can detect optical signals received at detector opening 124. Components included in first fabricated package 116 can be wire bonded to contacts of a lead frame portion 119 that extend into first fabricated package 116. Accordingly, a light source and photo detector in first fabricated package 116 can be electrically coupled to circuitry in or connected to second fabricated package 114.

Opposing surface 134 (of first fabricated package 116) is on an opposite side of first fabricated package 116 relative to surface 133.

The configuration of dual stage fabricated package 104 in FIG. 1A may result from removing dual stage fabricated package 104 from a common lead frame and bending lead frame portion 119. For example, tooling of a (computerized or otherwise automated) component assembly system can be programmed to cut dual stage fabricated package 104 from a common lead frame and bend lead frame portion 119 such that the length of second fabricated package 114 is essentially perpendicular to opposing surface 134.

Second fabricated package 114 includes insert opening 181 that can receive a component insert having Integrated Circuits ("ICs") or surface mount components that include active and/or passive circuitry. As depicted, PCB insert 191 has been inserted into the insert opening 181. However, component inserts on other types of substrates can also be inserted into insert opening 181. Contacts of PCB insert 191 or some other component insert can be wired bonded to contacts of lead frame portion 119, for example, to the metal contacts within insert opening 181. PCB insert 191 or some other type of component insert can be secured to second fabricated package 114 with epoxy. ICs on PCB insert 191 and other component inserts can be protected by epoxy globbing, potting, by attaching a cover over insert opening 181, or by incorporating a cover into a lens holding clip.

Figure 5:
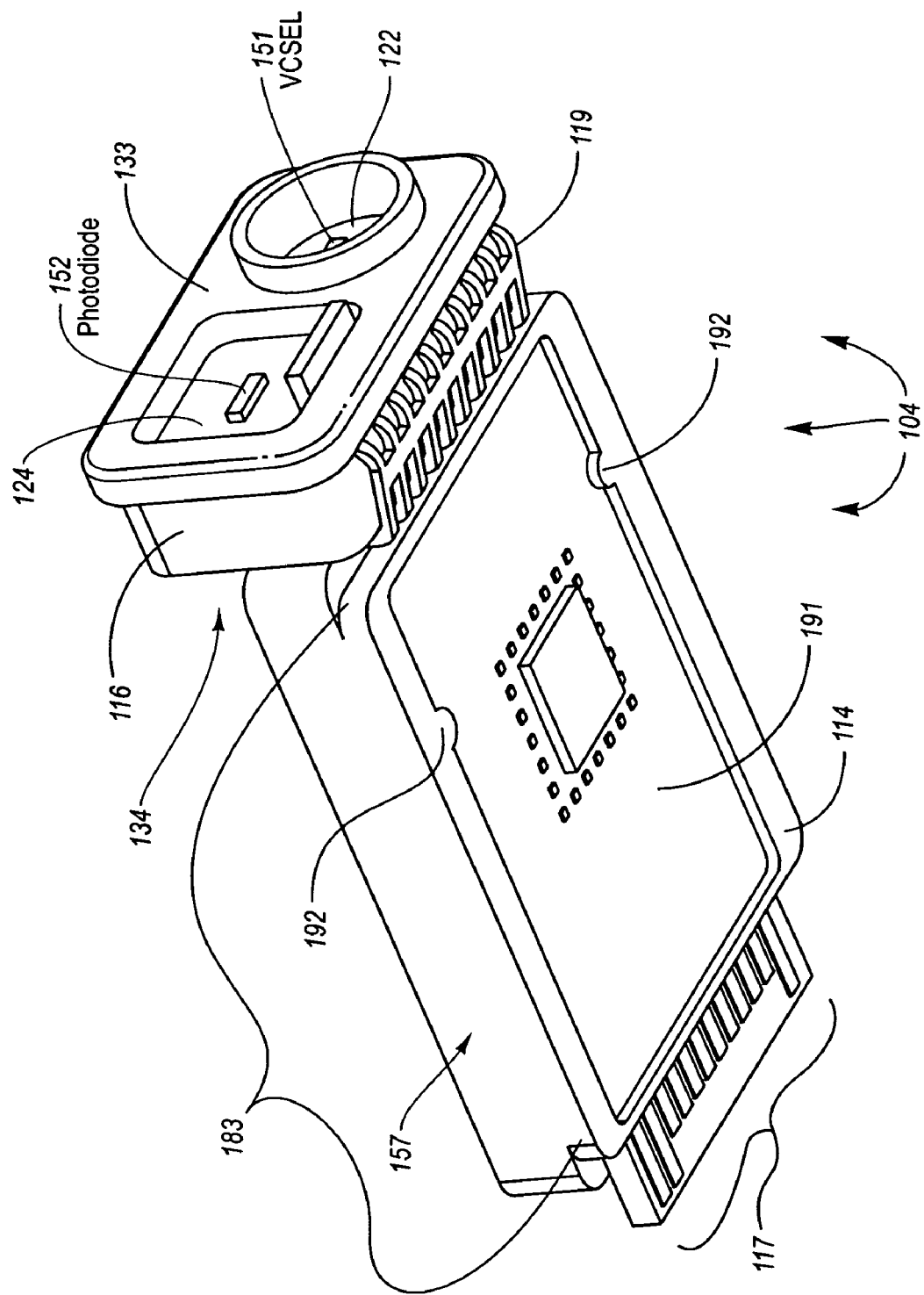
FIG. 5 illustrates an example dual stage fabricated package including a component insert inserted from the bottom side of the dual stage fabricated package.

PCB inserts can also be inserted into openings on the opposite side of fabricated package 114. For example, referring briefly to FIG. 5, FIG. 5 depicts an example of PCB insert 191 inserted into insert opening 183 (the side opposite of insert opening 181). Further, PCB inserts inserted into insert opening 183 need not be the same or even similar to PCB inserts inserted into insert opening 181. In some embodiments, PCB inserts are inserted into both insert opening 181 and opening 183. Accordingly, each PCB insert can have circuitry that facilitates the transfer of optical and electrical signals.

PCB insert 191 and other component inserts can include active and/or passive circuitry components for driving a light source (e.g., a laser driver), converting a received light signal (e.g., transimpedance amplifier), or for implementing other optical signal processing. For example, circuitry of PCB insert 191 can interoperate with components (e.g., a VCSEL 151 and photodiode 152) in first fabricated package 116 (via lead frame portion 119) to send and/or receive optical signals. As depicted, PCB insert 191 includes card edge connector 117 for connecting to other components on a substrate (e.g., a network panel). Accordingly, components of PCB insert 191 and components included in first fabricated package 116 can electrically interoperate with components on the substrate through card edge connector 117.

Tooling of a (computerized or otherwise automated) component assembly system can also be programmed to appropriately insert a component insert (e.g., PCB insert 191) into insert opening 181 and/or insert opening 183. Alignment features 192 and corresponding alignment slots on a component insert facilitate proper alignment of the component insert during insertion into insert opening 181 ands/or insert opening 183. After insertion into insert opening 181 and/or insert opening 183, electrical contacts of a component insert can be wire bonded to exposed contacts in insert opening 181 and/or insert opening 183 to cause circuitry of the component insert to be electrically coupled (via lead frame portion 119) to components included in first fabricated package 116. Also after insertion into insert opening 181 and/or insert opening 183, epoxy can be used to mechanically secure a component insert to second fabricated package 114.

Further, although PCB inserts have been described with respect to FIGS. 1A-1C and 5, it should be understood that other types of component inserts, such as, for example, ceramic substrates, silicon substrates, glass substrates, and other leadframe-based (possibly insert-molded) substrates can also be inserted into openings of second fabricated package 114. For example, it may be that a glass substrate is inserted into insert opening 181. Embodiments also include insertion of one type of component insert into one opening and insertion of a second type of component into another opening. For example, a silicon substrate insert can be inserted into insert opening 181 and a ceramic substrate insert inserted into insert opening 183. Tooling of a (computerized or otherwise automated) component assembly system can be programmed to insert component inserts into second fabricated package 114 when and where appropriate.

In some configurations, second fabricated package 114 has external contacts for surface mounting on a substrate. In these alternate configurations, components of component insert and components included in first fabricated package 116 can electrically interoperate with components on the substrate through the external contacts. External connections can be formed leads, for example, thru hole, gull-wing, hot bar style, etc. For example, second fabricated package 114 can include pins of the thru hole pin configured lead frame that extend perpendicular to surface 157.

It may be that card edge connector 117 or other external contacts facilitate connecting (both electrically and mechanically) to a Printed Circuit Board Assembly ("PCBA"), such as, for example, a network panel or Host Bus Adapter ("HBA"). Accordingly, components included in first fabricated package 116 can be electrically connected to components in second fabricated package 114 (through lead frame portion 119) and further connected to components external to dual stage fabricated package 104 (through card edge connector 117 or other external contacts).

Figure 1B:
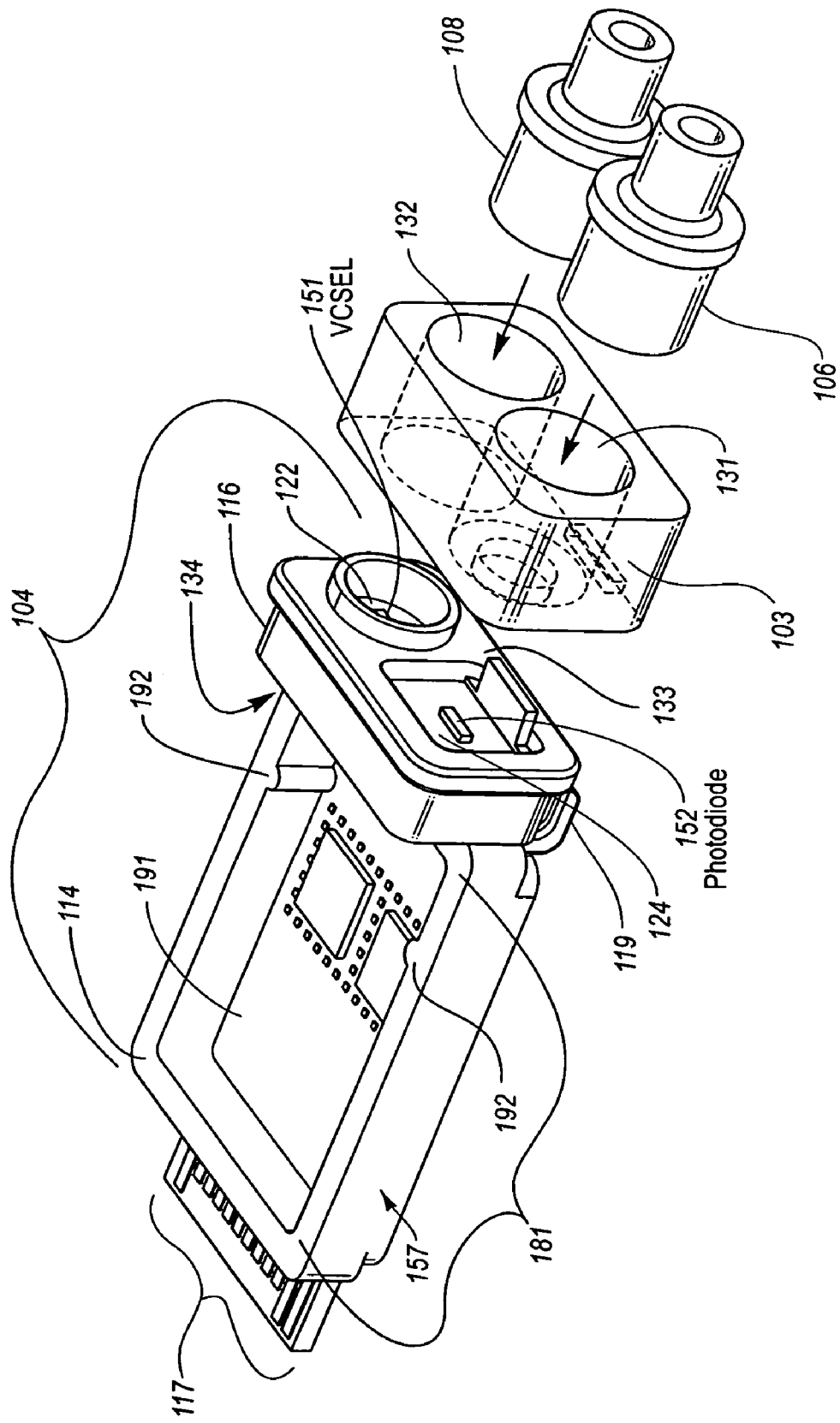
FIG. 1B illustrates components of the example dual stage fabricated package relative to other optical components.

FIG. 1B illustrates components of the dual stage fabricated package 104 relative to other optical components. As depicted in FIG. 1B, lens pins 106 and 108 can be slip fit into and mechanically coupled to lens block 103. Lens block 103 can in turn be placed in mechanical contact with and secured to surface 133.

Lens block 103 can include corresponding receptacles for accepting lens pins (e.g., lens pins 106 and 108). Each of the lens pins 108 and 106 can include a corresponding lens that facilitates the transfer (transmission or reception) of optical signals. For example, lens pin 108 can be positioned and aligned over a transmission opening on surface 133 such that generated optical signals are transmitted out the end of lens pin 108. Similarly, lens pin 106 can be positioned and aligned over a reception opening such that received optical signals are directed at a corresponding photo detector.

Lens block 103 may or may not include lens elements. For example, in some embodiments, lens elements are included in one or more of receptacles 131 and 132 and/or in one or more other appropriate receptacles based on lens block configuration. Included lens elements can be collimating lens elements. In other embodiments, no receptacles include lens elements.

Lens block 103 and lens pins 106 and 108 can be passively or actively aligned with transmission and/or reception openings in surface 133. Passive alignment can include assembling components that were manufactured within specified tolerances such that assembling the components causes the components to be aligned. For example, passive alignment can include obtaining a lens block including a transmitting lens pin and a receiving lens pin, each of the lens pins being configured to receive a fiber optic cable that is capable of carrying optical signals. Passive alignment can also include obtaining a dual stage fabricated package that includes a light emitting component and a light detecting component. Passive alignment can also include passively aligning the light emitting component with a lens in the transmitting receptacle by attaching the lens block to the dual stage fabricated package such that a specified optical power from the light emitting component through the transmitting receptacle can be achieved.

Active alignment can include adjusting the position of components that are lightly held together such that optical signal strength is optimized and then more permanently fixing the position of the components. For example, active alignment can include aligning a lens pin, a lens block, and a dual stage fabricated package in a first direction, a second direction, and a third direction such that the signal strength of optical signals transferred between a lens included in the lens pin and the fabricated package is optimized. Active alignment can also include mechanically coupling the lens pin to the lens block to fix the position of the lens relative to the fabricated package in the first direction. Active alignment can also include subsequent to mechanically coupling the lens pin to the lens block, re-aligning the lens block and the dual stage fabricated package in the second and third directions such that the signal strength of optical signals transferred between the lens and the dual stage fabricated package is again optimized. Active alignment can also include mechanically coupling the lens block to the dual stage fabricated package to fix the position of the lens block relative to the dual stage fabricated package in the second and third directions.

In some embodiments, optimizing signal strength includes aligning components such that the output signal strength is maximized. In other embodiments, optimizing signal strength includes aligning components such that the output signal strength closely approximates a pre-selected signal strength (e.g., that is some amount less than the maximum possible output signal strength). Optimizing signal strength to a pre-selected level can include determining the alignment that maximizes signal strength and then "backing off" from the maximum by a fixed amount in a controlled manner.

Lens block 103 and dual stage fabricated package 104 can be held together using a variety of attachment means, such as, for example, epoxy, metal clips, or laser welding. Laser welding can be particularly advantageous when lens block 103 and dual stage fabricated package 104 are made of similar plastic compounds. Lens pins (e.g., lens pins 108 and 106) can be held to lens block 103 using similar means.

Figure 1C:
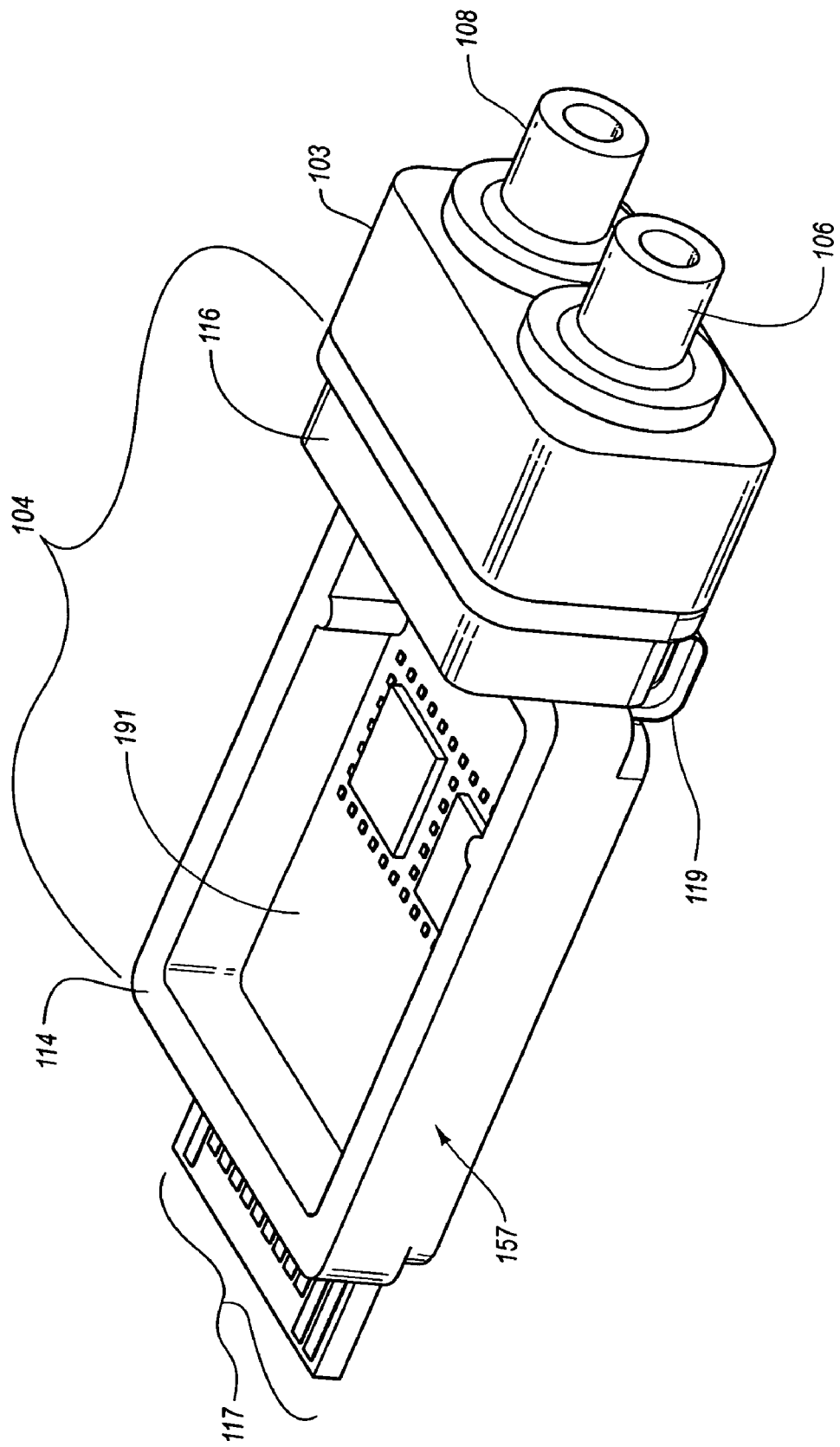
FIG. 1C illustrates components of an example assembled modular optical device package including an example dual stage fabricated package and other optical components.

FIG. 1C illustrates components of an example assembled modular optical device package including dual stage fabricated package 104, lens block 103 and lens pins 106 and 108

Figure 2:
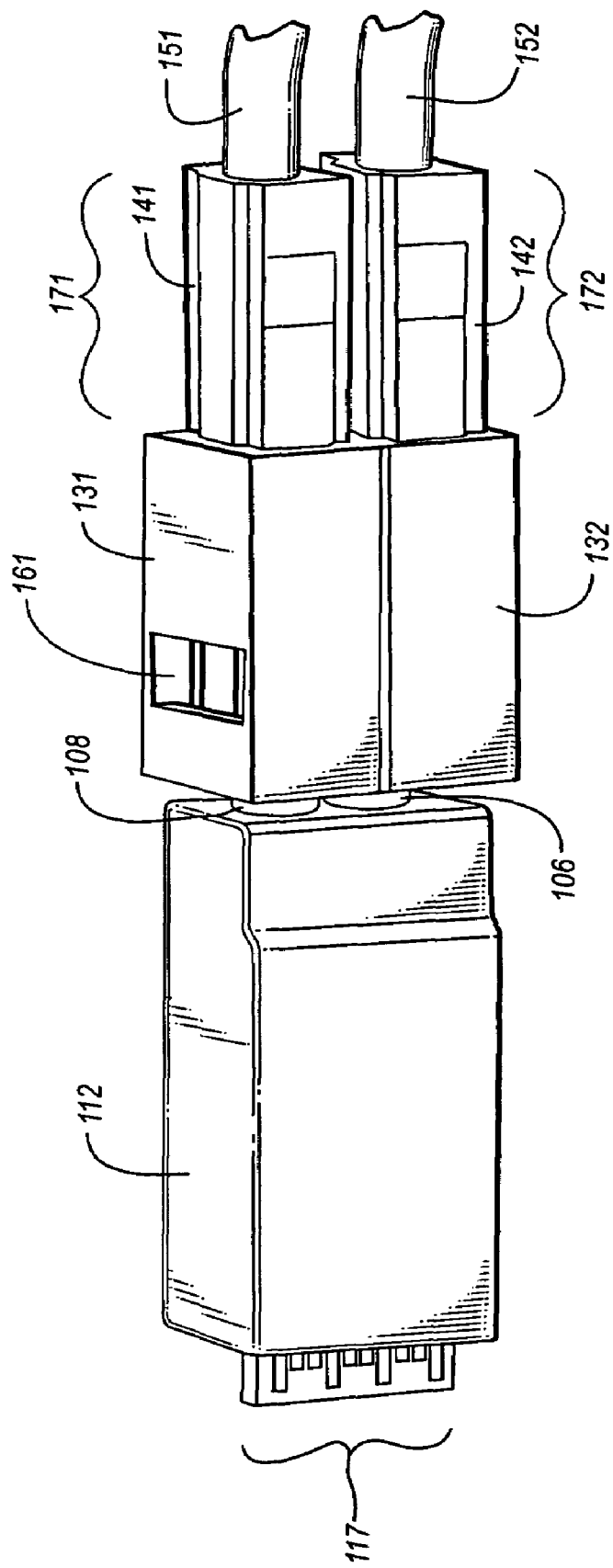
FIG. 2 illustrates the example assembled modular optical device package inside a protective metal housing and relative to optical connectors.

FIG. 2 illustrates the example assembled modular optical device package inside a metal housing 112 and relative to optical connectors 131 and 132. Metal housing 112 can provide an Electromagnetic Interference ("EMI") barrier and Electrostatic Discharge ("ESD") protection to the components of dual stage fabricated package 104, lens block 103, and lens pins 106 and 108. Metal housing 112 can be of an interweave design to reduce EMI emissions from components of dual stage fabricated package 104, lens block 103, and lens pins 106 and 108. A custom bezel of metal housing 112 can provide ground contact fingers. As depicted in FIG. 2, connectors 131 and 132 are mechanically coupled to lens pins 108 and 106 respectively.

Cable ends 141 and 142 terminate optical cables 151 and 152 respectively. Cable ends 141 and 142 can be secured in connectors 131 and 132 respectively to provide an optical connection between optical cables 151 and 152 and the components of dual stage fabricated package 104. For example, optical signals generated by a VCSEL in first fabricated package 116 can be transferred through lens block 103, through a lens in lens pin 108 and into optical cable 151 for transmission to other optical devices. On the other hand, optical signals received from optical cable 152 can be transferred through a lens in lens pin 106, through lens block 103, and received at a photodiode in first fabricated package 116. Generally, lens pins 106 and 108 can be configured to receive any of a variety of connectors, such as, for example, SC, LC, ST, and FC connectors. Other configurations of modular optical devices can be configured as appropriate to simultaneously connect to a corresponding number of optical connectors.

Connector 131 can be configured with opening 161 such that when cable end 141 is inserted into connector end 131 a specified distance, a latching arm of cable end 141 protrudes into opening 161 to secure cable end 141 to connector 131. Applying pressure to the latching arm can cause the latching arm to rescind out of opening 161 such that cable end 141 can be removed from connector 131. A similar mechanism can be used to secure and release cable end 142 from connector 132.

In other embodiments, a cable end is configured with a releasing mechanism that is external to corresponding connectors (e.g., external to connectors 131 and 132). For example, pressure can be applied somewhere along portion 171 to release cable end 141 from connector 131. Similarly, pressure can be applied somewhere along portion 172 to release cable end 142 from connector 132.

A connecter can include an internal latch receptacle for receiving a latching arm of an optical cable end. Securing an optical cable end in the connector can cause the latching arm to engage the latch receptacle. Applying pressure to a releasing mechanism outside of the connector can cause the latching arm to disengage from the latch receptacle and the optical cable end can be removed form the connector. It may be that MU style connectors with an internal latch receptacle and corresponding cable ends with an external releasing mechanism (or latch access) are used to increase the density of optical transceiver modules on a substrate.

Figure 3:
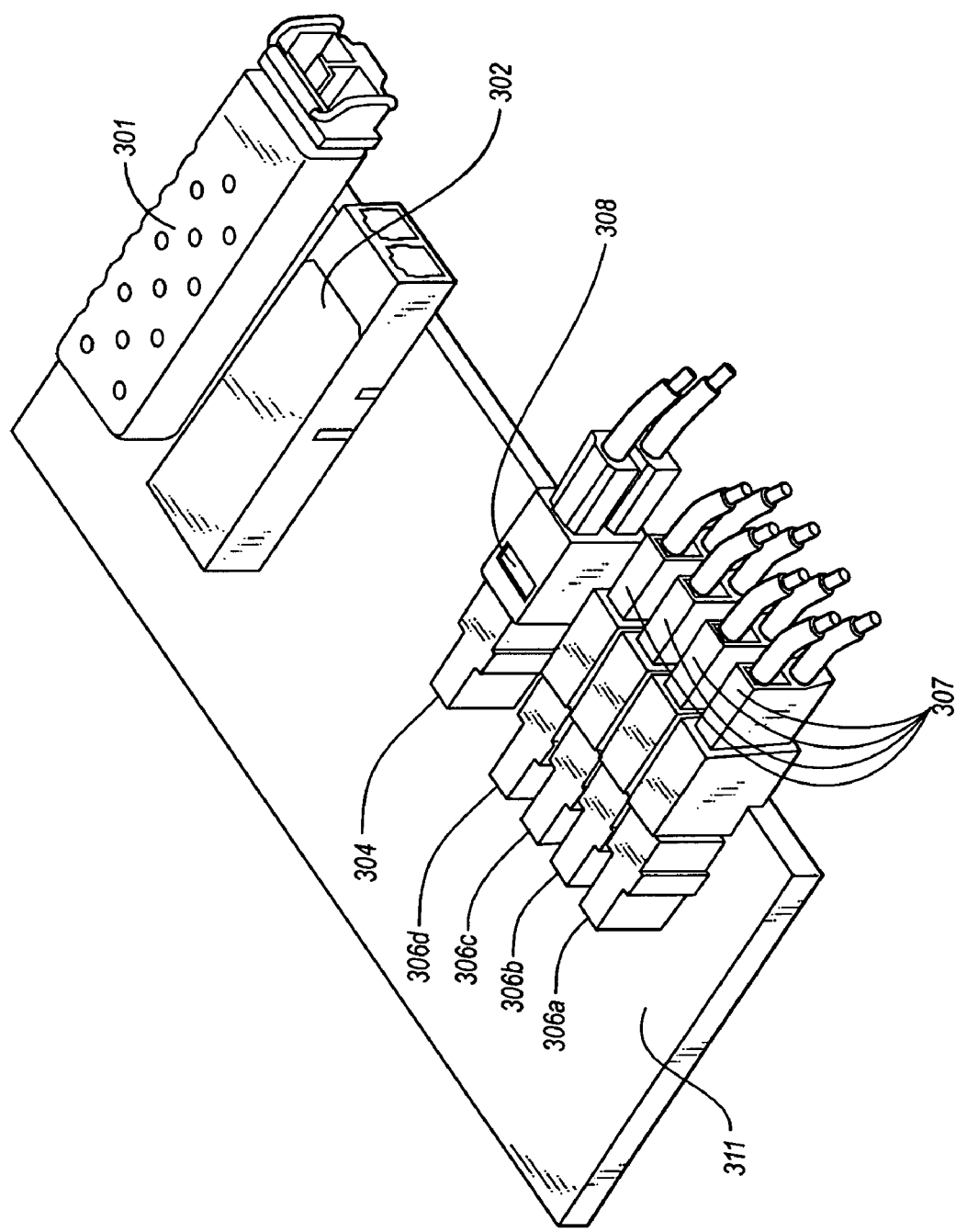
FIG. 3 illustrates an example view of various transceivers positioned on a substrate.

FIG. 3 illustrates an example view of various transceivers positioned on a substrate. Transceiver 301 has dimensions in accordance with the Small Form Factor ("SFF") MultiSource Agreement ("MSA") and transceiver 302 has dimensions in accordance with the Small Form Factor Pluggable ("SFP") MSA. Transceiver 304 is similar to the optical device depicted in FIG. 2 and includes releasing mechanism 308 for releasing an optical cable end. As depicted, the orientation of transceiver 304 results in transceiver 304 having a smaller footprint on substrate 311 as compared to the footprints of transceivers 301 and 302 on substrate 311. Thus, the orientation of the transceiver conserves space on substrate 311. Further, since pressure can be applied to releasing mechanism 308 in a direction perpendicular to the surface of substrate 311 (as opposed to parallel to the surface of substrate 311), the spacing between transceivers can be decreased thereby facilitating higher density arrays.

Transceivers 306A, 306B, 306C, and 306D depict a high density array of transceivers. Each of the transceivers 306A, 306B, 306C, and 306D include a releasing mechanism 307 that is external to a corresponding connector. Releasing mechanisms 307 can be included in MU style connectors used to increase the density of optical transceiver modules on a substrate.

Transceivers 304, and 306A-306D can include external contacts (e.g., contacts of a thru pin configured or formed lead frame) that facilitate mounting (e.g., surface mounting) transceivers 304, and 306A-306D to substrate 311. The external contacts can extend out of a fabricated package and through corresponding metal housings of transceivers 304, and 306A-306D. The metal housing can include openings that permit exposure of the external contacts.

Thus, external connections can enable data transmission and/or reception, as well as the transmission and reception of control and monitoring signals, between transceivers 304, and 306A-306D and substrate 311 (or other appropriate components). Electrical communication can include communication between a light source included in a fabricated package, such as, for example, a laser and a corresponding laser driver circuit on substrate 311. Likewise, electrical communication can include communication between a light detector included in a fabricated package, such as, for example, a photodiode, and a corresponding transimpedance amplifier circuit on substrate 311.

Components (not shown), such as, for example, light emitting diodes, a laser driver, a post amplifier, a transimpedance amplifier, a current bias driver, volatile and/or non-volatile memory, and a thermoelectric cooler ("TEC") can be implemented on substrate 311. Components can be implemented on either side of substrate 311 as appropriate. Implemented components can interface electrically with transceivers 304 and 306A-306D through appropriate connections. When substrate 311 is coupled to an optical hub, optical router, or other device, such implemented components can interface electrically with the computer system or other device. Mounting components, circuits and devices on both sides of substrate 311 can facilitate a compact structure without any meaningful loss in functionality.

Generally, the substrate 311 can be any type of printed circuit board implemented as a suitable connector interface for use with a computer system, wherein the connector interface may take the form of, for example, a peripheral component interconnect ("PCI") card having edge connectors configured and arranged to interface with a desktop computer system. The connector interface may alternatively take the form of, for example, a printed circuit board with a serial or parallel port, or a Personal Computer Memory Card International Association ("PCMCIA") standard card. The connector interface may also be an appropriate interface for insertion in an optical hub or optical router. Note that as used herein, "connector interface" generally refers to a PCB or other device that acts as an interface between an optical component, such as a transceiver, and a host system such as a laptop computer, desktop computer, optical hub, optical router, etc.

Figure 4:
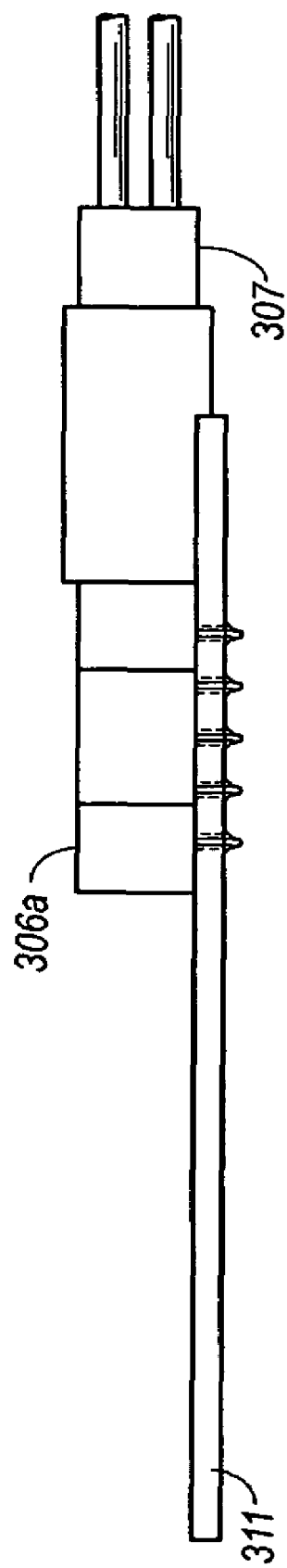
FIG. 4 illustrates a side view of a transceiver mounted on a substrate.

As previously described, external connections from a transceiver can be formed leads, such as, for example, thru hole, gull-wing, hot bar style, etc. FIG. 4 depicts a side view of transceiver 306a mounted on substrate 311. As depicted, a lead frame having a thru hole pin configuration facilitates electrical communication between circuitry (not shown) on substrate 311 (or other components to which modular transceiver is mounted) and transceiver 306a. To secure transceiver 306a to substrate 311, pins of the thru hole pin configured lead frame can be inserted through thru holes in substrate 311. Subsequently, thru hole pins can be mechanically and electrically coupled to substrate 311. Pins of a thru hole pin configuration can be connected to substrate 311 in a variety of ways, including, but not limited to, surface mount connectors, thru hole connectors, and compression-type connectors. Accordingly, a thru hole pin configured lead frame enables data transmission and/or reception, as well as the transmission and reception of control and monitoring signals, between transceiver 306a and substrate 311 (or other appropriate components).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A modular optical device, comprising:
    a first fabricated package including at least one of a light source for generating optical signals and a light detector for detecting received optical signals, the first fabricated package having a first surface with at least one opening for transferring optical signals and a second opposing surface;
    a second fabricated package with an opening for accepting a component insert, the second fabricated package being oriented such that the length of the second fabricated package is essentially perpendicular to the second opposing surface;
    a lead frame that mechanically connects the first fabricated package and the second fabricated package and that electrically connects the at least one of the light source and light detector in the first fabricated package to contacts exposed in the opening of the second fabricated package;
    a component insert mechanically coupled to the second fabricated package and electrically coupled to the exposed contacts such that components of the component insert can electrically interoperate with the at least one of the light source and light detector to transfer optical signals; and
    a lens block mechanically coupled to the first fabricated package, the lens block configured such that one or more lens pins can mechanically couple to the lens block.

2. The modular optical device as recited in claim 1, wherein the first fabricated package includes a light detector for detecting optical signals.

3. The modular optical device as recited in claim 1, further comprising:
    one or more external connectors mechanically coupled to the second fabricated package, the one or more external connectors facilitating mechanical and/or electrical connections to external components.

4. A modular optical device, comprising:
    a first fabricated package including at least one of a light source for generating optical signals and a light detector for detecting received optical signals, the first fabricated package having a first surface with at least one opening for transferring optical signals and a second opposing surface;
    a second fabricated package with an opening for accepting a component insert, the second fabricated package being oriented such that the length of the second fabricated package is essentially perpendicular to the second opposing surface;
    a lead frame that mechanically connects the first fabricated package and the second fabricated package and that electrically connects the at least one of the light source and light detector in the first fabricated package to contacts exposed in the opening of the second fabricated package; and a component insert mechanically coupled to the second fabricated package and electrically coupled to the exposed contacts such that components of the component insert can electrically interoperate with the at least one of the light source and light detector to transfer optical signals, wherein a card edge connector of the component insert extends outside the second fabricated package.

5. The modular optical device as recited in claim 1, further comprising:

a lens pin mechanically coupled to the lens block, the lens pin configured for directing an optical signal between the light source and a corresponding external component.

6. The modular optical device as recited in claim 1, further comprising:

a lens pin mechanically coupled to the lens block, the lens pin configured for directing an optical signal between an external component and the light detector.

7. The modular optical device as recited in claim 1, wherein the first fabricated package includes a laser.

8. The modular optical device as recited in claim 1, wherein the first fabricated package includes a photodiode.

9. The modular optical device as recited in claim 1, wherein the first fabricated package is a plastic fabricated package and the second fabricated package is a plastic fabricated package.

10. The modular optical device as recited in claim 4, further comprising:

a lens block mechanically coupled to the first fabricated package, the lens block configured such that one or more lens pins can mechanically couple to the lens block.

11. The modular optical device as recited in claim 1, further comprising:

a metal housing surrounding the first fabricated package, the second fabricated package, the lead frame, and the printed circuit board to protect the surrounded components from inappropriate electrical signals and to reduce the transmission of inappropriate electrical signals from the components.

12. The modular optical device as recited in claim 11, wherein the metal housing is of an interweave design.

13. The modular optical device as recited in claim 11, wherein the metal housing includes a custom bezel with ground contact fingers.

14. The modular optical device as recited in claim 1, further comprising:

a connector for coupling an optical cable end to a lens pin, the connector including an opening for receiving a latching arm of the optical cable end, the cable end being secured to the connector when the latching arm protrudes into the opening, the cable end being releasable from the connector by applying pressure to the latching arm when the latching arm is exposed in the opening.

15. The modular optical device as recited in claim 1, further comprising:

a connector for coupling an optical cable end to a lens pin, the connector including an internal latch receptacle for receiving a latching arm of an optical cable end, the cable end being secured to the connector when the latching arm engages the internal latch receptacle, the cable end being releasable from the connector by applying pressure to a releasing mechanism of the optical cable end that is external to the connector.

16. An optoelectronic interface device comprising:

a printed circuit board with at least one connector for electrically interfacing with a host device; and a high density array of modular optical devices configured to mechanically and electrically interface with the printed circuit board, each modular optical device in the high density array comprising:

a first fabricated package including at least one of a light source and a light detector;

a second fabricated package with an opening for accepting circuitry that is to electrically interoperate with the at least one of a light source and a light detector, the second fabricated package being oriented such that the length of the second fabricated package is essentially perpendicular to the second opposing surface;

a lead frame that mechanically connects the first fabricated package and the second fabricated package and that electrically connects the at least one of the light source and light detector in the first fabricated package to contacts exposed in the opening of the second fabricated package;

a component insert mechanically coupled to the second fabricated package and electrically coupled to the exposed contacts such that components in the component insert can electrically interoperate with components included in the first fabricated package to transfer optical signals;

a lens block mechanically coupled to the first fabricated package, the lens block configured to accept one or more lens pins; and at least one lens pin mechanically coupled to the lens block, the at least one lens pin for transferring an optical signal between the at least one of a light source and a light detector and an external component.

17. The optoelectronic interface device as recited in claim 16, wherein each modular optical device further comprises:

a metal housing surrounding the first fabricated package, the second fabricated package, the lead frame, the component insert, the lens block, and a portion of the at least one lens pin to protect the surrounded components from inappropriate electrical signals and to reduce the transmission of inappropriate electrical signals from the components.

18. The optoelectronic interface device as recited in claim 17, wherein at least one metal housing is of an interweave design.

19. The optoelectronic interface device as recited in claim 17, wherein at least one metal housing includes a custom bezel with ground contact fingers.

20. The optoelectronic interface device as recited in claim 16, wherein each modular optical device further comprises:

at least one connector for coupling an optical cable end to a lens pin, the connector including an opening for receiving a latching arm of the optical cable end, the cable end being secured to the connector when the latching arm protrudes into the opening, the cable end being releasable from the connector by applying pressure to the latching arm when the latching arm is exposed in the opening.

21. The optoelectronic interface device as recited in claim 16, wherein each modular optical device further comprises:

at least one connector for coupling an optical cable end to a lens pin, the connector including an internal latch receptacle for receiving a latching arm of an optical cable end, the cable end being secured to the connector when the latching arm engages the internal latch receptacle, the cable end being releasable from the connector by applying pressure to a releasing mechanism of the optical cable end that is external to the connector.

22. The optoelectronic interface device as recited in claim 16, wherein the component insert for at least one modular optical device comprises an edge connector for connecting to components of the printed circuit board.

23. The optoelectronic interface device as recited in claim 16, wherein at least one modular optical device comprises an external connection for mounting the modular optical device to the printed circuit board.

24. The optoelectronic interface device as recited in claim 16, wherein the optoelectronic interface device is configured to be substantially received within a slot of a host device the host device being selected from among a desktop computer, a laptop computer, an optical hub, and an optical router.

25. A modular optical device comprising:
- a first fabricated package including a laser and a photodiode, the first fabricated package having a first surface and a second opposing surface, the first surface having an opening for transmitting optical signals and an opening for receiving optical signals;
- a second fabricated package with an opening for accepting circuitry that is to electrically interoperate with the laser and the photodiode, the second fabricated package being oriented such that the length of the second fabricated package is essentially perpendicular to the second opposing surface;
- a lead frame that mechanically connects the first fabricated package to the second fabricated package and that electrically connects the laser and the photodiode in the first fabricated package to contacts exposed in the opening of the second fabricated package;
- a component insert mechanically coupled to the second fabricated package and electrically coupled to the exposed contacts such that components of the component insert can electrically interoperate with the laser and the photodiode;
- a lens block configured to receive a plurality of lens pins and configured to mechanically couple to a first fabricated package;
- a first lens pin mechanically coupled to the lens block for directing an optical signal from the laser to an external component;
- a second lens pin mechanically coupled to the lens block for directing an optical signal from an external component to the photodiode;
- a metal housing the surrounds the first fabricated package, the second fabricated package, the lead frame, the component insert, the lens block, and a portion of the first and second lens pins such that a portion of the first and second lens pins remains exposed, the metal housing for protecting the surrounded components from inappropriate electrical signals and to reduce the transmission of inappropriate electrical signals from the surrounded components;
- a first connector mechanically coupled to the exposed portion of the first lens pin, the connector for receiving a first optical cable end; and
- a second connector mechanically coupled to the exposed portion of the second lens pin, the connector for receiving a second optical cable end.

* * * * *

UNITED STATES PATENT AND TRADEMARK OFFICE
CERTIFICATE OF CORRECTION

| | | |
|---|---|---|
| PATENT NO. | : 7,455,463 B2 | Page 1 of 1 |
| APPLICATION NO. | : 11/145268 | |
| DATED | : November 25, 2008 | |
| INVENTOR(S) | : Togami et al. | |

It is certified that error appears in the above-identified patent and that said Letters Patent is hereby corrected as shown below:

Column 6
Line 42, change "package 114" to --package 104--

Column 9
Line 54, after "108", add --.--

Column 10
Line 33, change "connecter" to --connector--
Line 39, change "form" to --from--
Lines 61-63, change "306A, 306B, 306C, and 306D" to --306$a$, 306$b$, 306$c$, and 306$d$--

Column 11
Lines 1-28, change "306A-306D" to --306$a$-306$d$--
Line 2, change "thru pin" to --thru hole pin--

Column 15
Line 11, after "host device", insert --,--

Signed and Sealed this
Fifteenth Day of February, 2011

David J. Kappos
*Director of the United States Patent and Trademark Office*